United States Patent [19]
Vickers et al.

[11] Patent Number: 5,693,946
[45] Date of Patent: Dec. 2, 1997

[54] SINGLE PHOTON IMAGING WITH A BI-LINEAR CHARGE-COUPLED DEVICE ARRAY

[75] Inventors: James Squire Vickers, Newton; Supriya Chakrabarti, Concord, both of Mass.

[73] Assignee: Trustees of Boston University, Boston, Mass.

[21] Appl. No.: 661,771

[22] Filed: Jun. 11, 1996

[51] Int. Cl.⁶ .............................. H04N 3/00; G01T 1/29
[52] U.S. Cl. ........................ 250/370.08; 348/316
[58] Field of Search .................. 250/370.1, 370.08; 348/171, 172, 138, 316, 311

[56] References Cited

U.S. PATENT DOCUMENTS

| | | |
|---|---|---|
| 3,864,595 | 2/1975 | Lawrence et al. . |
| 3,965,354 | 6/1976 | Fletcher et al. . |
| 4,395,636 | 7/1983 | Anger et al. . |
| 4,432,017 | 2/1984 | Stoffel et al. .......................... 348/316 |
| 4,437,160 | 3/1984 | Blum . |
| 4,507,733 | 3/1985 | Blum . |
| 4,539,587 | 9/1985 | Eby et al. ........................... 348/138 |
| 4,639,599 | 1/1987 | Ichihara . |
| 4,672,193 | 6/1987 | Duchenois et al. . |
| 4,808,826 | 2/1989 | Lim et al. . |
| 5,175,434 | 12/1992 | Engdahl . |
| 5,336,888 | 8/1994 | Odom . |
| 5,391,878 | 2/1995 | Petroff . |
| 5,400,071 | 3/1995 | Yamada ................................. 348/316 |
| 5,410,156 | 4/1995 | Miller . |
| 5,461,226 | 10/1995 | Nicoli et al. ..................... 250/214 VT |

OTHER PUBLICATIONS

M. Lampton & F. Paresce, The Ranicon: A resistive anode image converter, Rev. Sci. Instrum., vol. 45, No. 9, 1974, pp. 1098–1105.

O.H.W. Siegmund, et al., Wedge and strip image readout systems for photon-counting detectors in space astronomy, Journal of the Opt. Soc. Am. A, vol. 3, 1986, pp. 2139–2145.

*Primary Examiner*—Constantine Hannaher
*Attorney, Agent, or Firm*—Baker & Botts, L.L.P.

[57] ABSTRACT

A Bi-Linear CCD Array is used to locate the centroid of a charge cloud produced by an MCP stack. Preferably, an anode comprises a checkerboard-like structure of x- and y-conductive pads. The x-pads are connected in columns and feed charge into x-charge buckets via a FET pass gate. The y-pads are connected in rows and feed charge into y- charge buckets via an FET gate. A conductive area collects charge that misses the x- or y- pads and is used to sense the arrival of a charge cloud. The x- and y-charge buckets, under the influence of x- and y-shift circuitry, pass their charge to x- and y-charge amplifiers. X- and y- counters keep track of the number of x- and y- shifts that occur before x- and y-detectors, connected to the x- and y-charge amplifier outputs respectively, locate the x- and y-bucket containing the most charge. Latching the x- and y-counter values when the respective x- and y-peaks occur captures the centroid coordinates of the charge cloud.

32 Claims, 4 Drawing Sheets

SINGLE PHOTON IMAGING WITH A BI-LINEAR CHARGE-COUPLED DEVICE ARRAY

FIELD OF THE INVENTION

The invention relates generally to single-photon imaging. More specifically, it relates to single photon imaging using a modified Charge Coupled Device ("CCD") array to locate a centroid of a charge cloud.

BACKGROUND OF THE INVENTION

Single-photon imaging is important in a number of applications, including nuclear medicine for detecting and imaging X-rays projected through the body. Single-photon imaging is also important, for example, in astronomical research. Several techniques of single-photon imaging are generally known. In one such technique several microchannel plates ("MCP") biased at high voltage and operated at high-vacuum are used to convert single-photon events arriving at a negatively biased side of the MCP stack into a rapid burst of several million electrons (a charge cloud) emerging from an opposite (positively biased) side of the MCP stack. Because this charge cloud emerges directly opposite to where the impinging photon initially strikes the MCP stack, single-photon imaging is achieved by collecting the charge cloud on an anode and locating its centroid. With an MCP detector, therefore, the essence of the problem of imaging individual photons is reduced to the electrical problem of locating the centroid of a charge cloud on an anode.

In the past, attempts have been made to solve the problem of locating a centroid under the conditions described above. For example, a Multi-Anode Microchannel Array (MAMA) detector has been used. This design places a crossed array of wires directly behind an MCP to serve as the anode. When an emergent charge cloud strikes the intersection of two wires, the (x,y) coordinate of the incident photon can be determined. In practice, MAMA detectors were not widely used due to the difficulty of using these detectors. The crossed-wire anode which collects charge from the MCP stack is delicate and difficult to build. Also, one charge amplifier is required per wire in the anode. Therefore, 2048 charge amplifiers are required for a detector with 1024×1024 pixel elements. Because of the large number of charge amplifiers, MAMA detectors use a large number of electrical parts and require a relatively large mount of power to operate. Also, MAMA detectors, at least initially, usually require specialized curved-channel MCPs which are not readily available and are not sufficient in quality for MAMA detectors to operate effectively.

Centroid location techniques based on charge division are more commonly used. U.S. Pat. No. 3,965,354 issued to Fletcher et al. discloses an example of a charge-division detector (e.g., a resistive anode image converter detector). Fletcher discloses an anode layout which divides a charge cloud into either 2, 3, or 4 separate signals. Fletcher further discloses that a coordinate of the incident photon is found by summing and dividing appropriate signals.

U.S. Pat. No. 4,395,636 issued to Anger et al. discloses another charge-division detector (e.g., "wedge & strip" detectors). Anger replaces the resistive anode with a wedge, strip, and a zig anode. This anode locates the centroid of a charge cloud with higher resolution and fewer distortions than that of Fletcher. This approach, however, also utilizes a large volume of support electronics. These support electronics consume substantial power. Moreover, the wedge and strip anode of Anger can only process about 20 to 40 thousand events per second, which is not fast enough for certain applications. Further, the event-processing and readout electronics of charge division detectors suffer from both thermally induced and age related electrical drifts and as a result the resolution of long term measurements is reduced. These are undesirable drawbacks. Other drawbacks also exist.

Recent advances in electronics have allowed measurement of nanosecond time scales with picosecond resolution. Time-delay anodes, or delay-line anodes, may provide greater resolution than charge-division anodes. Time-delay anodes are built by laying a long serpentine-line conductor over a substrate. As a charge cloud from the MCP strikes a region of this conductor, two pulses begin propagating in opposite directions along it. The original event location is encoded by the small difference in arrival times of the two pulses at the end of the shipline.

FIG. 4 depicts a mixed-mode wedge-wedge/time-delay anode. An MCP is configured to deposit a charge cloud onto one or more central wedge-shaped portions 402 of the anode 400. The serpentine wires 404 above and beneath the wedge-shaped portions 402 conduct charge via as long a path as possible to fast charge amplifiers (not shown) that attach to the square pads 406. The horizontal coordinate of an impinging charge cloud is encoded by the difference in arrival times at the square pads of either the top or the bottom delay line (a time-delay technique) and the vertical coordinate is determined by the relative distribution of charge on the top versus the bottom anode wedge elements (a charge-division technique).

Time-delay detectors have certain disadvantages. For example, time-delay detectors typically require substantial support electronics to operate. As described above, time-delay detectors measure the difference between arrival times of two pulses that counter-propagate down a delay line. Because the pulse-propagation speed is so fast (approximately the speed of light), the measured time delay is small (typically about a ten nanosecond maximum delay time). This requires substantial support electronics which may include two fast (nanosecond) charge-sensitive amplifiers (CSA), one at each end of the delay line, two constant-fraction discriminators (CFD), one per CSA, each of which analyzes the output pulse from a CSA and produces a trigger signal when said pulse has reached a constant fraction (usually one-half) of its peak value, one time-to-amplitude converter (TAC), which converts the difference in arrival times of the trigger signals generated by the CFDs into a voltage that is proportional to the time between trigger signals and one analog-to-digital converter (ADC) that converts the voltage generated by the TAC into a digital signal that can be read by, for example, a computer. These components may be purchased commercially, however, more rugged custom-built electronics are generally required for space applications, for example. The required electronics consume substantial power, e.g., about 15 Watts of power, and occupy a sizeable volume. Further, like charge division detectors, the event-processing and readout electronics of time-delay detectors suffer from both thermally induced and age related electrical drifts and as a result the resolution of long term measurements is reduced. These are undesirable drawbacks. Other drawbacks also exist.

Another method of centroid location uses CCD detectors. For example, a CCD is used as the anode and the charge cloud is deposited directly into the CCD pixels. After several charge clouds are detected by the array, the two-dimensional array is read, and software begins searching for centroids.

This technique also suffers from various drawbacks. For example, use of conventional CCD detectors requires a significant amount of intense computations which typically requires a computer to find the two dimensional centroid of the numerous charge clouds. For n pixel elements along the CCD edge, $n^2$ pixels typically must be read from the CCD and processed to locate a centroid. Conventional CCD detectors also typically suffer the constant bombardment of the active CCD substrate by energetic electrons, which can quickly damage the CCD and render the detector useless. These are all undesirable drawbacks. These drawbacks often make conventional CCD detectors impractical for high-speed centroid detection applications. Other problems and drawbacks also exist with each of the approaches discussed above.

SUMMARY OF THE INVENTION

It is an object of the present invention to overcome these and other drawbacks of the prior art.

It is another object of the present invention to provide a fast, durable, efficient, high resolution single photon imaging method and apparatus.

It is another object of the present invention to provide a method and apparatus for centroid location without any need for support electronics and therefore with low power consumption.

It is a further object of the present invention to provide a single photon imaging method and apparatus that locates the centroid of a charge cloud by using an anode comprising a grid-like structure of conductors and pads which convey charge to a shifting mechanism that conveys charge into a peak-detection circuit that determines the coordinate of the centroid of the charge cloud.

It is another object of the present invention to provide high-resolution imaging over a large area, i.e., a high pixel count.

If is a further object of the present invention to provide single-photon imaging capabilities with absolute pixel linearity and orthogonality that is free from the effects of electrical drift.

The present invention overcomes problems and disadvantages associated with the prior art and provides a new apparatus and method for locating the centroid of an incident electron charge cloud. One embodiment of the present invention is directed to a Bi-Linear CCD Array for locating the centroid of a charge cloud produced by an MCP stack. Preferably, an anode is provided that comprises, on a single silicon substrate, a plurality of conductive pads that are arranged in a checkerboard-like structure. The pads collect charge, as from a charge cloud produced by an MCP stack. Preferably, certain pads that form a row are electrically connected and can pass their collective charge, by way of a pass gate, to a single bucket of a vertical CCD shift register. Similarly, separate pads that form a column are electrically connected and can pass their collective charge by way of a pass gate to a single bucket of a second CCD shift register. In this manner, a vertical CCD shift register is formed by a chain of buckets, where each bucket is electrically connected to a row of pads through a pass gate. Also a horizontal CCD shift register is formed by a chain of buckets, where each bucket is electrically connected to a Column of pads. Rows and columns remain electrically isolated from each other. The remaining area of the anode substrate may be metallized to collect charge that misses the rows and columns of the pads and may also be used to sense the arrival of a charge cloud.

For example, the anode may comprise a plurality of columns of x-pads, each having 1 pads per column. These x-pads feed charge, by way of a FET gate, into x CCD buckets. The anode further comprises a plurality of rows of y-pads, each having j pads per row, which deposit their charge, by way of a FET gate, into j charge buckets. The remaining area of the anode substrate may be metallized to collect charge that misses the x- and y-pads, and also may be used to sense the arrival of a charge cloud.

According to one embodiment of the present invention, after a charge cloud arrives at the surface of the anode and is sensed by the metallized portion of the silicon substrate, the charge bucket FET gates preferably close, thereby capturing the single photon event within the charge buckets. Next, the x and y charge buckets, under the influence of a shift clock, pass their charge to a charge amplifier of the type typically found on CCD chips. Preferably, counters count shift pulses until a peak output, corresponding to a centroid, is detected.

One advantage of the present invention is that it requires only n shifts (vs $n^2$ for a CCD array) to read all information from an n x n pixel array. This increases the speed at which individual photons can be imaged. A related advantage of this technique is that the coordinates of the centroid of the charge cloud are determined by locating the peak output, as described above, which occurs as the horizontal and vertical CCD shift registers are being read. This is not so when locating a centroid using a CCD array. In this latter case, each of the $n^2$ CCD pixel must be read, converted from an analog charge level into a digital amber, and sent to a computer; once all pixels are received by the computer, software must analyze the array of CCD pixel intensities in order to find the centroid of a charge cloud. The present invention eliminates the need for the charge-to-digital converter, the centroiding computer and software and all but n of the $n^2$ read operations.

Another advantage of the present invention is that it can increase the charge-cloud detection rate by more than an order of magnitude over current designs. The charge-cloud detection rate is the rate at which charge clouds from an MCP arrive at the anode, which is related to the rate at which photons strike the MCP. This advantage may be realized by multiplexing the charge from the rows and columns of pads into numerous, for example, 8, 16 or 32, parallel CCD shift registers. When a charge cloud arrives, it is stored in one CCD shift register and can be read out. If a second charge cloud arrives while the first CCD shift register is busy, the multiplexer stores the collected charge in the next CCD shift register. In this manner, many events may be simultaneously processed. This process may be at least ten times faster than the detectors of the prior art.

Additionally, the present invention offers improved pixel linearity and orthogonality, and uses less power. Pixel linearity and orthogonality indicate how well a known pattern of light incident on the MCP is reproduced by the detector electronics. Currently, non-linearities in detector electronics produce distortions. As an example, the TAC converters used in time-delay electronics may have a gain that drifts with ambient temperature. All such distortions are eliminated in the present invention as the charge cloud is detected on metallized pads that can be placed with unprecedented accuracy using semiconductor practices. The event pattern reported by the present invention exactly matches the arrival pattern of the individual charge cloud. Therefore, hue pixel linearity and orthogonality is achieved.

The present invention is well suited for use with a digital interface. Because the present invention determines the charge-cloud location by counting pulses (a digital process) and latching the digital value in the counter at the time a peak signal is detected from the CCD shift register, the natural output of the proposed invention is digital values corresponding to the horizontal and vertical positions, on the hi-linear CCD array, of the charge cloud. Computers utilize digital signals so the interface between the present invention and a subsequent computer is simple and easy.

Another advantage of the present invention is the ability to obtain sub-pixel resolution. A chip-wide clock signal may be run at some multiple of the desired CCD shift rate. By counting (and latching at the peak) this multiple of the shift clock, sub pixel resolution may be achieved. For example, even though there may be only 100 rows and columns to a particular embodiment, the present invention may be capable of resolving several hundred pixels.

Yet another advantage of the present invention is that a digital (x, y) coordinate is obtained using standard CCD charge amplifiers, comparators, and passive components (without the need for analog to digital convertors).

An additional advantage of the present invention is that the detector can reside on a single silicon substrate, and requires minimal external circuitry to function. Other advantages of the present invention exist.

DETAILED DESCRIPTION OF THE PREFERRED EMBODIMENTS

Figure 1:
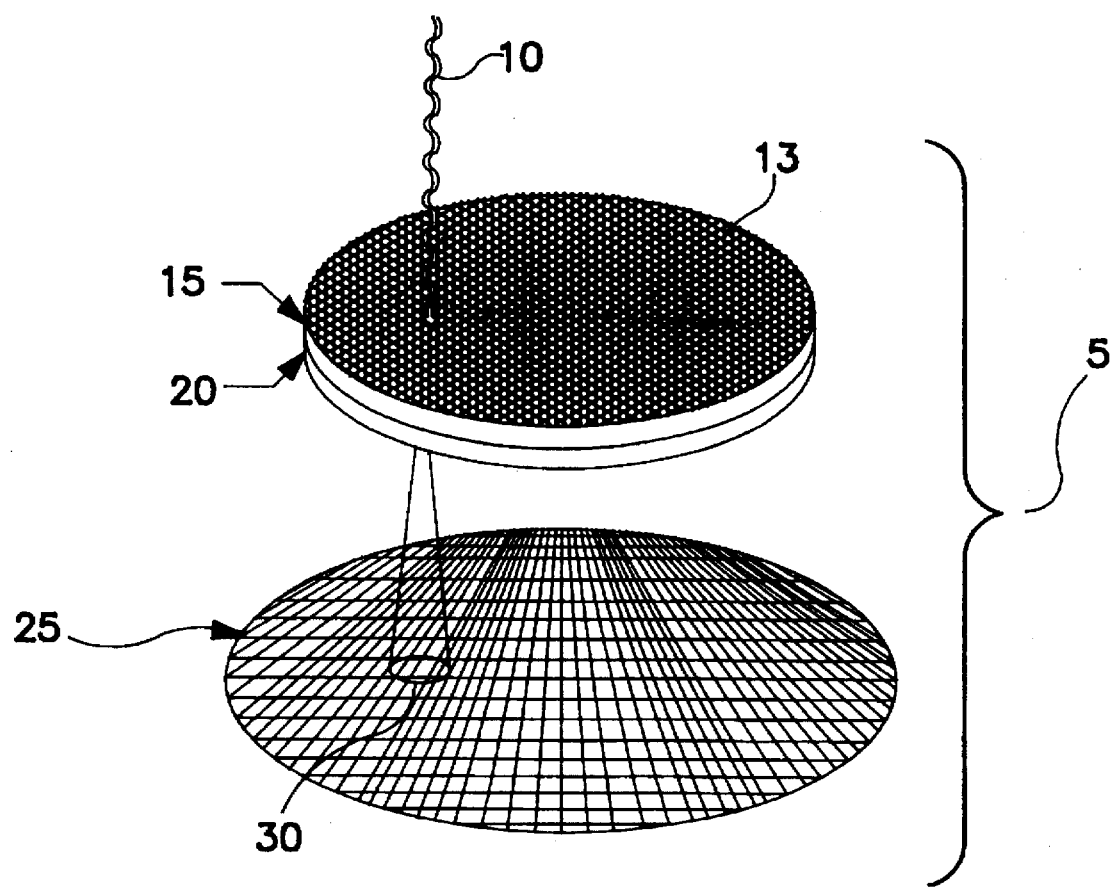
FIG. 1 depicts a schematic of a detection system according to one embodiment of the present invention.

With reference to FIG. 1, one embodiment of a single photon imaging system 5 of the present invention is shown. According to this embodiment, photon imaging system 5 comprises a plurality of micro channel plates 15 and an anode 25. The microchannel plates 15 each have a negatively biased surface 13 and a positively biased surface 20. Anode 25 is spaced a predetermined distance from the micro channel plates 15. Preferably anode 25 is positioned to have a surface substantially parallel to the surfaces of the micro channel plates 15 and faces towards positively biased surfaces 20. As shown in FIG. 1, when an incident photon 10 impinges on negatively biased surface 13 of the micro channel plates 15, a charge cloud 30 is produced and impinges on the surface of anode 25. By way of example, photon 10, may be of low energy (e.g., visible light), or it may be of higher energy such as in the ultra-violet or X-ray portion of the electromagnetic spectrum. The present invention may also be used for imaging photons, electrons, and ions.

Figure 2:
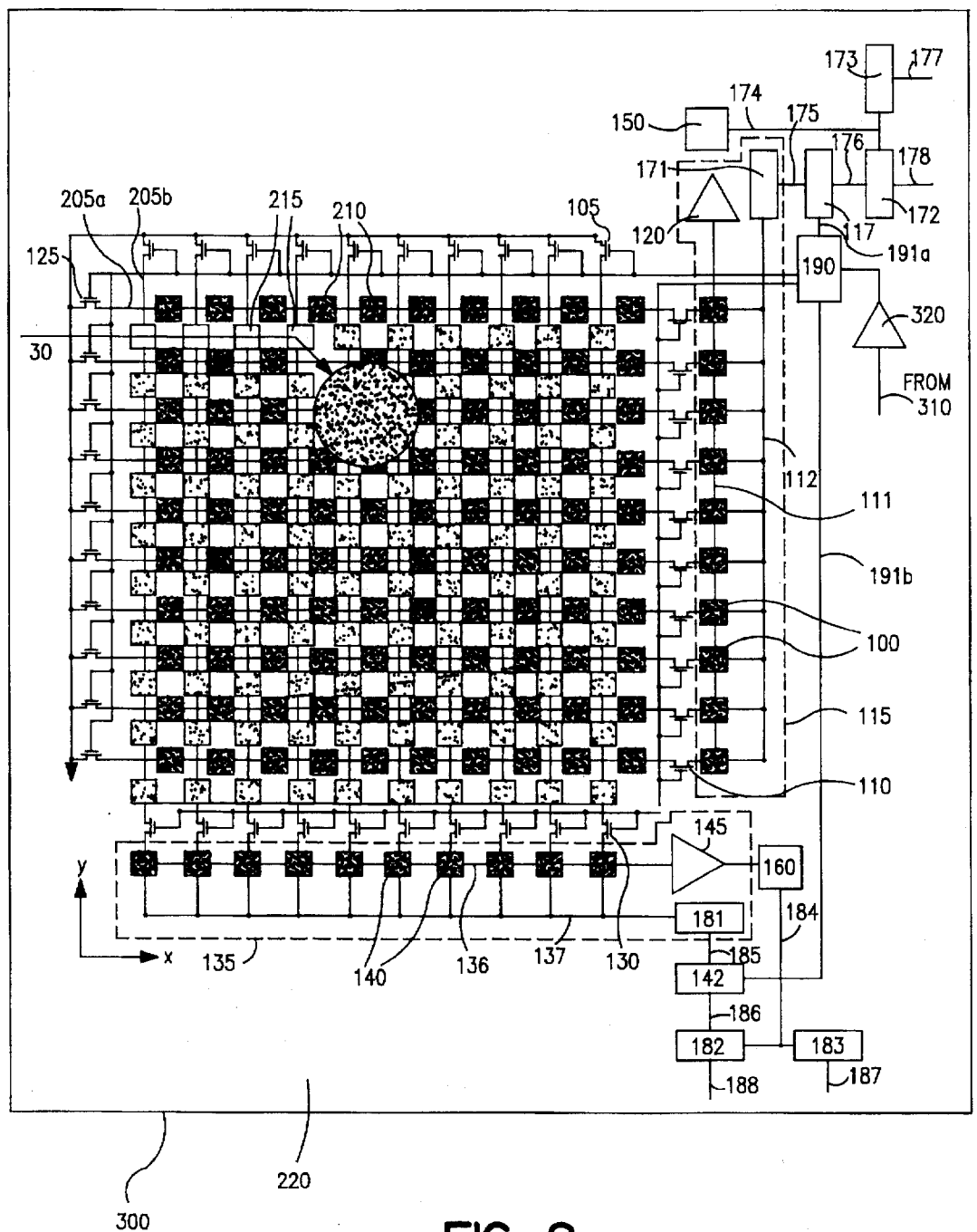
FIG. 2 depicts an anode circuit according to one embodiment of the present invention.

FIG. 2 shows one embodiment of an anode 25. As shown, the anode comprises an array of conductive pads 210 and 215 arranged in a checkerboard-like fashion on an exposed surface of a substrate 300. The conductive pads include a plurality of ($x_{ki}$) of x-pads 215 are provided in k columns with l pads in each column. Similarly, a plurality of ($Y_{ij}$) of y-pads 210 arranged in i rows each having j pads. Each of the y-pads 210 in a row are connected by a row conductor 205a.

Figure 3:
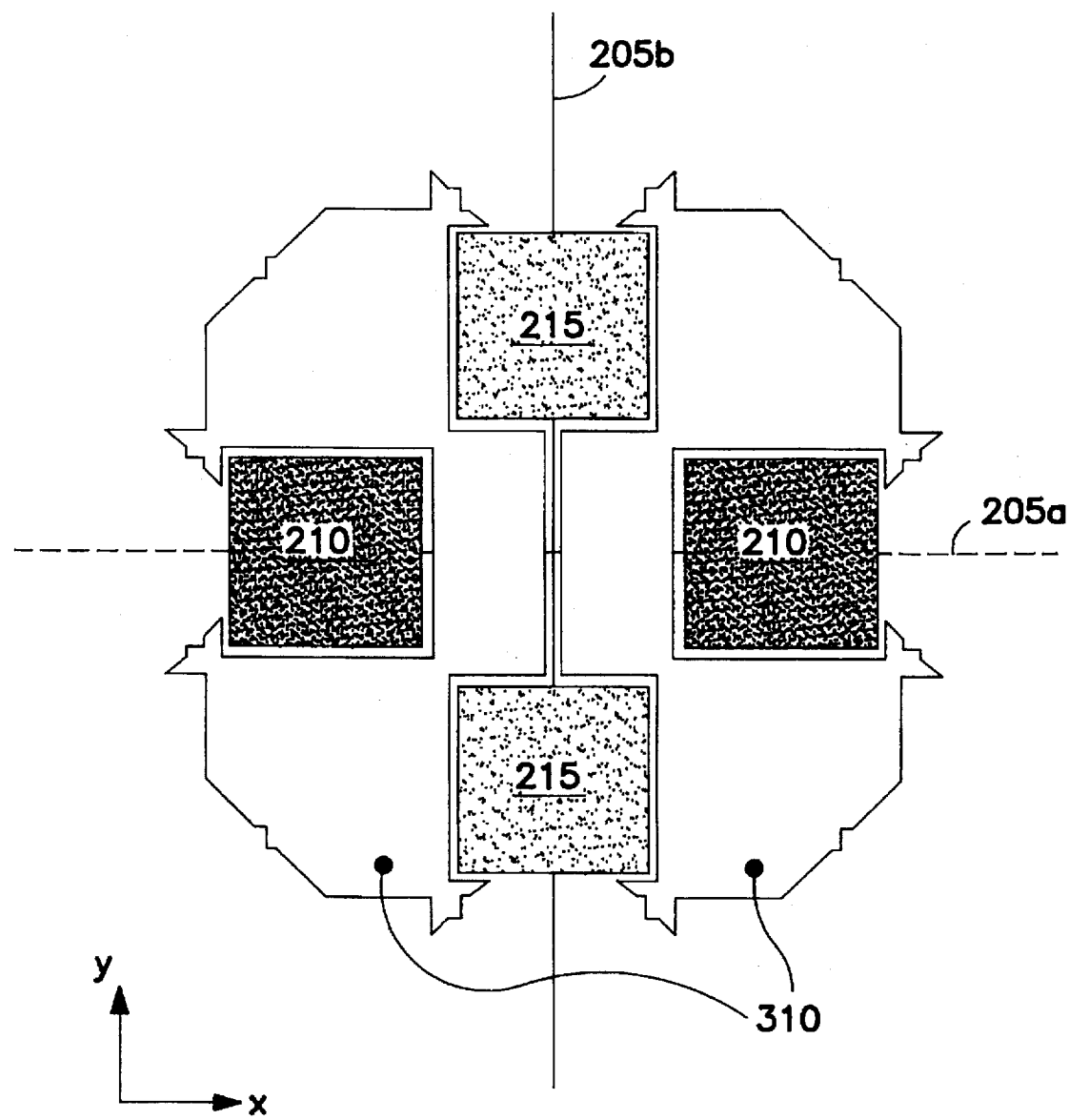
FIG. 3 depicts an exploded view of a detection grid of an anode circuit of FIG. 2 according to one embodiment of the present invention.
Figure 4:
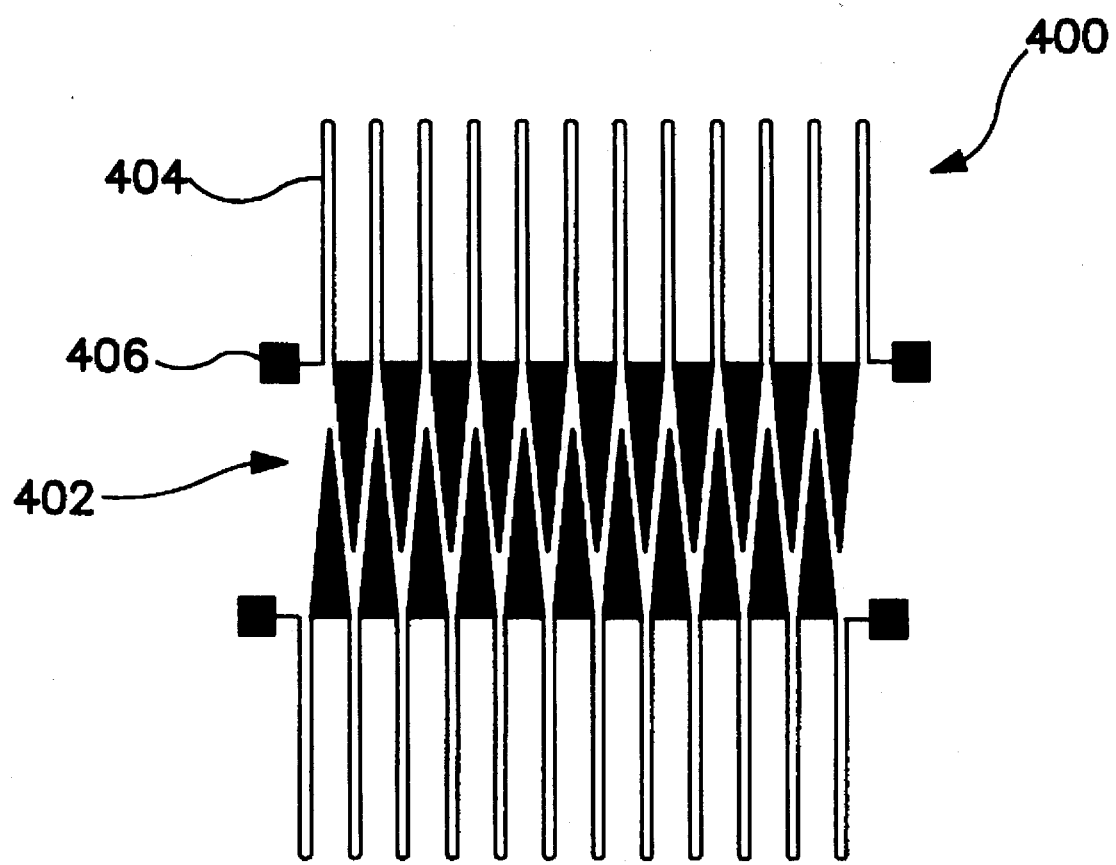
FIG. 4 depicts a time-delay anode according to the prior art.

Each of the x-pads 215 in a column are conducted by a column conductor 205b. As shown in FIG. 3, row conductors 205a and column conductors 205b do not electrically connect and may, optionally, be buried in a layer beneath the surface of the substrate 300 such as depicted for conductors 205a. In a preferred embodiment, pads 210 and 215 may be aluminized by aluminum coating, or by providing a pure aluminum pad.

Referring again to FIG. 2, one end of each of the row conductors 205a is connected to pad clearing gate 125. Another end of each of the row conductors 205a is connected to a gate 110. Gates 110 are preferably FET gates, but other types of gates could be used. Each gate 110 is connected to ay-charge bucket 100. A charge bucket may comprise a plurality of electrodes placed over a semiconducting channel diffused into the silicon substrate. The channel may comprise a long trough into which electrons may be stored. By manipulating the voltage on the plurality of electrodes placed over this channel, many "walls" may be electrically built around the trough, effectively converting the trough into a series of buckets. Furthermore, by timevarying the potential on the electrodes that lie over the channel, the "walls" holding charge in the buckets of the trough may be moved along the trough, effectively transporting the buckets of charge along the trough. This process may be known as "shifting" the charge down the shift register of the CCD.

Each y-charge bucket 100 may be connected via a y-channel 111 that is diffused into the substrate 300. They-channel 111 may be electrically separated into the y-charge buckets 100, via electrical potentials placed over the y-channel 111, via conductors 112, by a y-bucket shifting circuitry 171. A system clock within a chip control circuitry 190 sends a signal, via bus conductor 191a to the digitalycounter 117. The digital y-counter 117 controls, via conductors 175, the y-bucket shifting circuitry 171. The y-bucket shifting circuitry 171 may be used to advance charge stored in each y-charge bucket 100 along the y-channel 111 until the charge reaches the y-charge amplifier 120. Standard peak detection circuitry 150 detects the point in time when the peak of the signal from a y-amplifier 120 occurs. A peak detected by y-amplifier 120 generates a signal that is sent, via conductor 174, to a y-latch 172 and a y-interface circuitry 173. The y-latch 172, under command of the latch signal on conductor 174, latches the digital count value, via bus conductor 176, from the y-counter 117 and places this stored value on the bus conductors 178, which are shipped off the substrate 300 for external use. The y-interface circuitry 173, after receipt of the latch signal on conductor 174, generates signals for, and receives signals from, via bus conductor 177, external circuitry located off of the substrate 300. The signals on bus conductor 177 coordinate the transfer of digital data from the y-latch 172 to the off-substrate electronics. Collectively, the y-charge buckets 100, y-channel substrate 111, y-bucket shift circuitry 171, conductors 112, and amplifier 120 constitute a y-shift circuit 115..

Similarly, one end of each of the column conductors 205b is connected to pad clearing gate 105. Another end of each of the column conductors 205b is connected to a gate 130. Gates 105 and 130 are preferably FET gates, but other types of gates could be used. Each gate 130 is connected to an x-charge bucket 140. Each x-charge bucket 140 is connected via an x-channel 136 that is diffused into the substrate 300. The x-channel 136 may be electrically separated into the x-buckets 140, via electrical potentials placed over the x-channel 136, via conductors 137, by an x-bucket shifting circuitry 181. A system clock within a chip control circuitry 190 sends a signal, via bus conductor 191b to the digital x-counter 142. The digital x-counter 142 controls, via conductors 185, an x-bucket shifting circuitry 181. The x-bucket shifting circuitry 181 may be used to advance charge stored in each x-bucket 140 along the x-channel 136 until the charge reaches the x-charge amplifier 145. Standard peak detection circuitry 160 detects the point in time when the peak of the signal from the x-amplifier 145 occurs. A peak detected by element 160 generates a signal that is sent, via conductor 184, to an x-latch 182 and the x-interface circuitry 183. The x-latch 182, under command of the latch signal on conductor 184, latches the digital count value, via bus conductor 186, from the x-counter 142 and places this stored value on the bus conductors 188, which are shipped off the substrate 300 for external use. The x-interface circuitry 183, after receipt of the latch signal on conductor 184, generates signals for, and receives signals from, via bus conductor 187, external circuitry located off of the substrate 300. The signals on bus conductor 187 coordinate the transfer of digital data from the x-latch 182 to the off-substrate electronics. Collectively, the x-charge buckets 140, channel substrate 136, shift circuitry 181, conductors 137, and amplifier 145 constitute an x-shift circuit 135.

Pad clearing gates 105 and 125 are used to drain all charge from the columns and rows of the pads. Once a charge cloud is deposited onto the pads, the FET pass gates 110 and 130 open briefly to allow charge into the CCD buckets 100 and 140 but close quickly to store the charge in the buckets. This process leaves some charge on the pads which may then be cleared by briefly opening the FET pass gates 105 and 125 to connect all pads to ground potential and then closing quickly thereafter. Once the grounding gates are closed, the present invention may accept another charge cloud.

In addition to pads 210 and 215, the remaining portion of substrate 300 that is between the checkerboard pads may be electrically connected to form a sensing anode 310 (FIG. 3, for example). The bi-linear CCD may sense the arrival of a charge cloud 30 on this anode 310 using a charge amplifier 320. Sensing the arrival could then be the start signal that initiates the read process of the cloud on the pads.

The operation of this embodiment is as follows. The plurality of microchannel plates 15 are biased at high voltage and operated at high vacuum. The high voltage biasing source may comprise a commercially available high voltage power supply. The vacuum may be created by placing the microchannel plates in a vacuum chamber, for example. Negatively biased surface 13 may be maintained at, for example, about −4000 V, positively biased surface 20 may be maintained at, for example, about −300 V, and anode 25 may be maintained at, for example, about 0 V. When an incident photon 10 arrives at negatively biased side 13 of the micro channel plates 15, a charge cloud 30 is emitted from positively biased side 20 of microchannel plates 15, in a known manner. Charge cloud 30 strikes anode 25 and its occurrence is detected by the metallized base portion 220. The impingement of charge cloud 30 on the anode circuitry causes charge to accumulate on the array of conductive x-pads 210 and on the array of conductive y-pads 215.

On the x-axis, charge is transferred along conductors 205a to y-shift circuit 115. More specifically, charge is passed through gates 110 to x-charge buckets 100. Once charge is collected in y-charge buckets 100, gates 110 are closed. The collection of charge may be determined by anode 310, for example. For example, a charge amplifier 320 senses the arrival of the charge cloud 30 and triggers control circuitry 190. Control circuitry 190 then initiates the read process and sequences all gates (105, 110, 125, and 130). Counting circuitry 117 and bucket-shifting circuitry 171 subsequently cause the charge to be shifted out from the y-charge buckets 100 through amplifier 120 to peak detection circuitry 150. Peak detection circuitry 150 causes the number of clock pulses between the first arriving charge and the y-peak detection, as counted by counting circuitry 117, to be stored in latch 172, giving the y position of the centroid of the charge cloud.

On the y-axis, charge is transferred along conductors 205b to x-shift circuit 135. More specifically, charge is passed through gates 130 to x-charge buckets 140. Once charge has been collected in x-charge buckets 140, gates 130 are closed and charge is shifted out by shift clock 142. The charge is then transferred through amplifier 145 to peak detection circuitry 160. Amplifier 145 may be a standard CCD amplifier. Peak detection circuitry 160 causes the number of clock pulses between the first arriving charge and the x-peak detection, as counted by shift clock 142, to be stored in latch 182, giving the x position of the centroid of the charge cloud.

Pad clearing gates 105, 125 are electrically connected to ground. When a charge cloud strikes anode 25, a portion of the charge cloud may be collected by anode 310, and amplifier 320 then delivers a signal to chip control circuitry 190 that will initiate a sequence of events. First, control circuitry 190 clears counters 117, 142 and opens gates 110, 130 to allow charge on pads 210 and 215 into the shift circuits 115, 135. Shortly thereafter, control circuitry 190 closes gates 110, 130, capturing the charge in the shift circuits and thereafter briefly opens gates 105, 125, draining any remaining charge on pads 210, 215 to ground. Once gates 105, 125 close, anode 25 is ready to accept another charge cloud. Control circuitry 190 then begins reading registers 115, 135 to determine the coordinate of the charge cloud.

According to another embodiment of the present invention, the charge from the rows and columns of pads may be multiplexed into numerous, for example, 8, 16 or 32, parallel CCD shift registers. When a charge cloud arrives, it may be stored in one CCD shift register and may then be read out. If a second charge cloud arrives while the first CCD shift register is busy, the multiplexer stores the collected charge in the next CCD shift register. In this manner, many events may be simultaneously processed. This process may be at least ten times faster than the detectors of the prior art.

The foregoing is a description of a preferred embodiment of the present invention. Various alternatives will be apparent to one of ordinary skill in the art in light of the foregoing description. The invention is not limited to the foregoing. Rather it is only limited by the claims appended hereto.

What is claimed is:

1. A photon imaging apparatus for imaging particles, comprising:

first means for receiving a particle and converting the particle to a charge cloud; and, second means for receiving the charge cloud and determining a centroid of the charge cloud, the second means comprising a bi-linear CCD array.

2. The apparatus of claim 1 wherein the second means comprises:

a grid-like member for detecting a charge cloud, the grid-like member comprising a plurality of pads and a plurality of conductors.

3. The apparatus of claim 2 wherein the second means further comprises shifting means electrically connected to said plurality of conductors, for conveying the amount of charge from said plurality of conductors into shifted pulses, said plurality of conductors indicating the peak detection of said charge cloud, said shifting means positioned lateral to said grid-like member.

4. The apparatus of claim 3 wherein the second means further comprises:
counting means-for counting shifted pulses electrically connected to said shifting means, said shifted pulses indicating the centroid of said charge cloud.

5. The apparatus of claim 4 wherein said counting means latches the number of shift pulses that occur between the first pulse and peak detection, said number of pulses indicating the centroid of said charge cloud.

6. The apparatus of claim 4 wherein wherein said grid-like member, said shifting means, and said counting means are located on a single silicon substrate and require only external bypass capacitors to become fully functional.

7. The apparatus of claim 6 wherein said grid-like member, said shifting means, and said counting means each have only standard CCD charge amplifiers, comparators, and passive components.

8. The apparatus of claim 6 wherein said grid-like member, said shifting means, and said counting means each have no analog to digital convertors.

9. The apparatus of claim 3 wherein said bi-linear CCD array comprises a plurality of pads and said plurality of pads comprises a plurality of x-axis pads and a plurality of y-axis pads and wherein said plurality of conductors electrically connect each of a column of y-axis pads to said shifting means.

10. The apparatus of claim 3 wherein said bi-linear CCD array comprises a plurality of pads and said plurality of pads comprises a plurality of x-axis pads and a plurality of y-axis pads and wherein said plurality of conductors electrically connects each of a row of x-axis pads to said shifting means.

11. The apparatus of claim 3 wherein said shifting means comprises a plurality of gates, a plurality of charge buckets, and a shift clock.

12. The apparatus of claim 3 wherein said shifting means shifts the amount of charge collected from a plurality of conductors along particular axis as pulses.

13. The apparatus of claim 3 wherein a number of shifts performed by said shifting means is less than or equal to said plurality of charge buckets.

14. The apparatus of claim 1, wherein said means for receiving and converting comprises:
at least one detection means for detecting an incident particle; and
at least one converting means responsive to the incident particle for generating a charge cloud.

15. The apparatus of claim 1 wherein the second means comprises a metallized base for detecting a charge cloud.

16. The apparatus of claim 1 wherein the second means comprises a micro channel plate stack.

17. The apparatus of claim 1 wherein said bi-linear CCD array comprises a plurality of pads.

18. The apparatus of claim 17 wherein the plurality of pads comprises a plurality of x-axis pads and a plurality of y-axis pads.

19. The apparatus of claim 17 wherein the plurality of pads comprise passive aluminum pads.

20. The apparatus of claim 1 wherein the incident particle is a photon.

21. The apparatus of claim 1 wherein the incident particle is an electron.

22. The apparatus of claim 1 wherein the incident particle is an ion.

23. An anode for determining the centroid of an incident charge cloud comprising:
a grid-like member for detecting a charge cloud, the grid-like member comprising a plurality of pads and a plurality of conductors; and,
shifting means electrically connected to said plurality of conductors, for converting the amount of charge from said plurality of conductors into shifted pulses, said plurality of conductors indicating the peak detection said charge cloud, said shifting means positioned lateral to said grid-like member; and,
counting means for counting shifted pulses electrically connected to said shifting means, said shifted pulses indicating the centroid of said charge cloud.

24. A method of locating the source of an incident particle comprising the steps of:
receiving an incident particle;
converting the incident particle to a charge cloud;
receiving the charge cloud; and
using a bi-linear CCD array to determine a centroid of the charge cloud.

25. The method of claim 24 wherein the step of receiving the charge cloud comprises the step of:
providing a plurality of pads and a plurality of conductors, each pad detecting a portion of the charge cloud.

26. The method of claim 24 wherein the step of receiving the charge cloud comprises the step of:
converting the mount of charge from said plurality of conductors into shifted pulses, said plurality of conductors indicating the peak detection said charge cloud.

27. The method of claim 26 wherein the step of receiving the charge cloud further comprises the step of:
counting shifted pulses indicating the centroid of said charge cloud.

28. The method of claim 24 wherein the incident particle is a photon.

29. The method of claim 24 wherein the incident particle is an electron.

30. The method of claim 24 wherein the incident particle is an ion.

31. A method of locating the source of an incident particle comprising the steps of:
detecting and amplifying a particle event on a first device;
detecting an amplified particle event on a second device positioned such that the centroid of said amplified particle is spatially correlated to said particle event;
locating the centroid of said amplified particle event by transferring charge from said amplified particle event to charge collectors;
shifting said charge from said charge collectors to counters; and
counting the number of shift pulses that occur between the first pulse and peak detection.

32. A method of locating the centroid of a charge cloud comprising the steps of:
transferring charge from a charge cloud to charge collectors;
shifting said charge from said charge collectors to counters; and
counting the number of shift pulses that occur between the first pulse and peak detection.

* * * * *